US010942897B2

United States Patent
Colgate et al.

(10) Patent No.: US 10,942,897 B2
(45) Date of Patent: *Mar. 9, 2021

(54) FACILITATING FILE MONITORING VIA A KERNEL

(71) Applicant: SPLUNK INC., San Francisco, CA (US)

(72) Inventors: William King Colgate, Bellevue, WA (US); Sharad Kylasam, Seattle, WA (US)

(73) Assignee: SPLUNK Inc., San Francisco, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 15/885,658

(22) Filed: Jan. 31, 2018

(65) Prior Publication Data

US 2018/0203871 A1 Jul. 19, 2018

Related U.S. Application Data

(63) Continuation of application No. 14/523,167, filed on Oct. 24, 2014, now Pat. No. 9,940,336.

(51) Int. Cl.
*G06F 16/17* (2019.01)

(52) U.S. Cl.
CPC .............. *G06F 16/1734* (2019.01)

(58) Field of Classification Search
CPC .................................. G06F 16/1734
See application file for complete search history.

(56) References Cited

U.S. PATENT DOCUMENTS

| | | | | |
|---|---|---|---|---|
| 7,099,866 B1* | 8/2006 | Crosbie | ................ | G06F 21/552 |
| 8,055,613 B1* | 11/2011 | Mu | ..................... | G06F 16/1734 |
| | | | | 707/610 |
| 8,225,329 B1* | 7/2012 | Lynn | ...................... | G06F 13/28 |
| | | | | 719/314 |
| 2002/0091751 A1* | 7/2002 | Sonoda | .............. | G06F 12/0862 |
| | | | | 709/201 |
| 2003/0093620 A1* | 5/2003 | Huxoll | ................... | G06F 16/10 |
| | | | | 711/118 |

(Continued)

OTHER PUBLICATIONS

Jinxin Ma et al., A novel secure virtual storage device scheme, 2010, IEEE, vol. 1, 271-275, 5 pages.

(Continued)

*Primary Examiner* — Pierre M Vital
*Assistant Examiner* — Zuheir A Mheir
(74) *Attorney, Agent, or Firm* — Shook, Hardy & Bacon L.L.P.

(57) ABSTRACT

Various methods and systems for monitoring files in a computer system are provided. In this regard, aspects of the invention facilitate file monitoring without file handle use, as it pertains to file monitoring and tailing, thereby mitigating file handle locking conflicts. In various implementations, information for the monitored files is obtained from the kernel using a filter driver in the I/O path. When the filter driver detects write operations being performed on monitored files, file-write data is copied and placed in a kernel buffer, where it can be pulled by a user mode monitoring process and fed to a monitoring application. As such, there is no need for coordination between the monitoring process and the user mode processes of other third-party applications writing data to monitored files.

29 Claims, 7 Drawing Sheets

(56) References Cited

U.S. PATENT DOCUMENTS

| | | | | |
|---|---|---|---|---|
| 2005/0234866 A1* | 10/2005 | Kyler | .................... | H04L 63/123 |
| 2006/0101263 A1* | 5/2006 | Costea | .................. | G06F 21/566 |
| | | | | 713/164 |
| 2006/0120526 A1* | 6/2006 | Boucher | ................. | H04L 63/12 |
| | | | | 380/247 |
| 2007/0078915 A1* | 4/2007 | Gassoway | ............. | G06F 21/564 |
| 2011/0209219 A1* | 8/2011 | Zeitlin | .................. | G06F 21/554 |
| | | | | 726/23 |
| 2013/0333040 A1* | 12/2013 | Diehl | ...................... | G06F 21/56 |
| | | | | 726/24 |
| 2014/0095711 A1* | 4/2014 | Kim | .................... | H04L 63/1408 |
| | | | | 709/224 |
| 2014/0337562 A1* | 11/2014 | Long | .................. | G06F 12/0804 |
| | | | | 711/103 |

OTHER PUBLICATIONS

Notice of Allowance dated Mar. 12, 2018 in U.S. Appl. No. 14/523,167, 7 pages.

\* cited by examiner

FACILITATING FILE MONITORING VIA A KERNEL

CROSS-REFERENCE TO RELATED APPLICATIONS

This application is a continuation of U.S. application Ser. No. 14/523,167, filed Oct. 24, 2014, entitled "File Monitoring," the entirety of which is incorporated herein by reference.

BACKGROUND

File monitoring can provide valuable operational intelligence about various aspects of computer systems including performance, security, and user behavior; and, as such, is a common task for system administrators. Typically, when a computer file being monitored is written to by a process, such as a user mode application running on a computer system, a monitoring application (a second process running on the computer system) accesses that file, consumes the written-to data and associated metadata, and ingests it into a log or capture, or otherwise reports it. However, operating systems, such as Microsoft Windows®, are sensitive to file handle locking across separate processes. Accordingly, problems may occur when the application writing to the file assumes that it is the only process accessing that file. For example, when an application has closed a file and then uses the same file name to open and write to a file, a conflict can occur and the open call may fail when the monitoring application already has a file handle opened with the same name.

One approach to reducing this conflict is to implement some level of coordination between the monitoring process and the user mode application. But this can require pre-established or agreed-upon rules between the parties providing these processes. Moreover, under this approach, successful monitoring may be performed only with those applications or processes that have agreed to the pre-established rules. Thus, file monitoring would remain unavailable in many situations.

SUMMARY

Embodiments of the invention are directed to systems and methods for file monitoring in association with a computer system. In particular, file monitoring technologies are provided for bypassing file handle use, as it pertains to file monitoring and tailing, by obtaining information needed for monitoring from the kernel. For example, and as will be further described, in an embodiment, a special filter driver is placed in the I/O path. There the filter driver detects write operations being performed on the monitored files. The write-data is copied and placed in a kernel buffer, where it can be pulled by a user mode monitoring process and fed to a monitoring application. As such, the user mode process writing the data to the monitored file may be unaware that the file is even being examined. Moreover, as there is no need for coordination between the monitoring process and other third-party applications or OS components, files from all processes may be available for monitoring.

Some embodiments of the invention include functionality for monitoring multiple files. In particular, a single stream of file-write information obtained from the I/O path in the kernel may be multiplexed into separate streams, each corresponding to one of the monitored files. In one embodiment, identifying information, such as a source or index tag identifying the particular file being written to, is associated with each block of data corresponding to a file-write event in the stream of file-write information.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
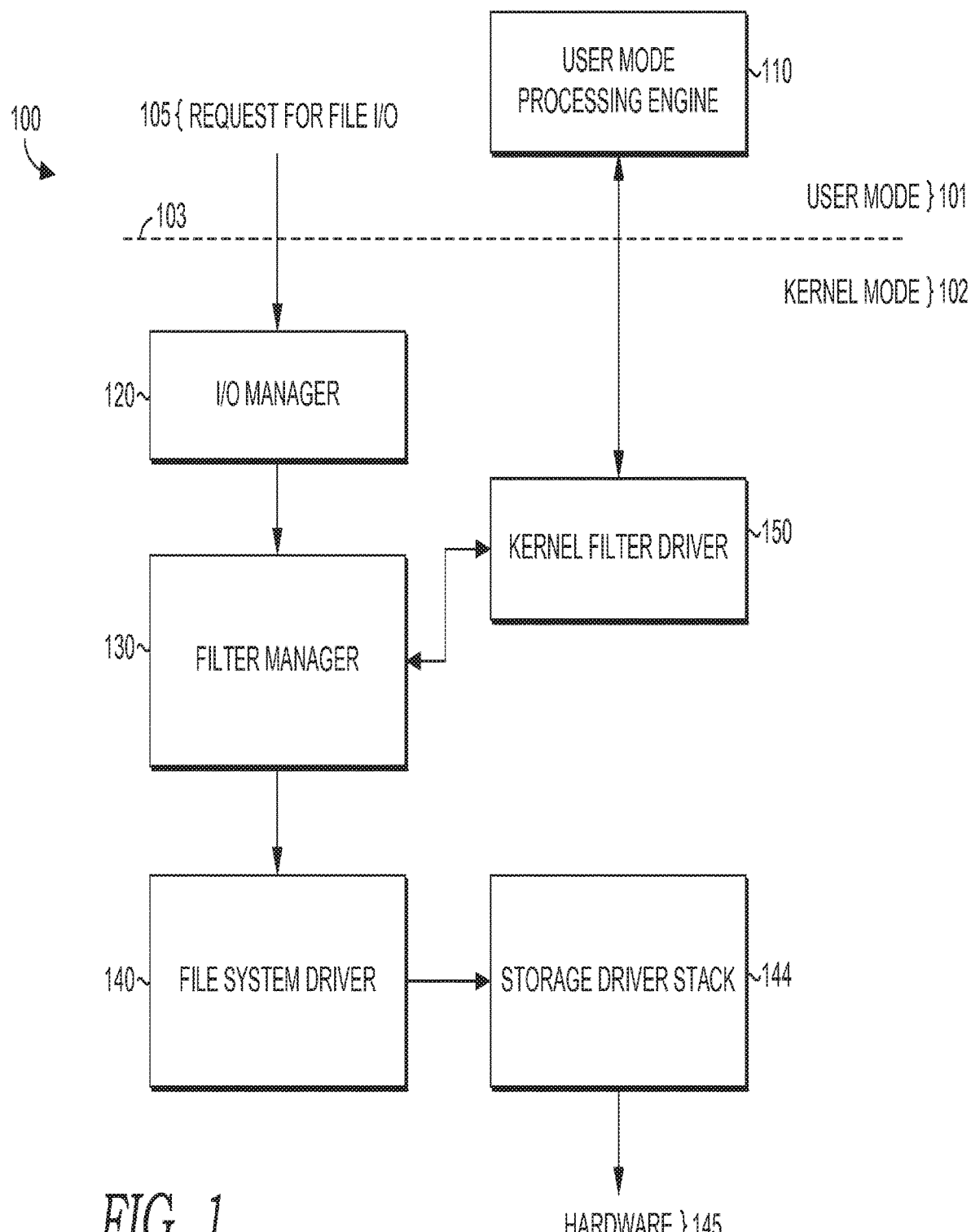
FIG. 1 is a block diagram of an exemplary operating environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive, and both (a or b thus includes either a or b, as well as a and b).

Monitoring or tailing computer files can provide valuable operational intelligence about computer systems or applications running on the systems, such as file changes, log updates, errors, or other useful information. Ordinarily, when a file that is being monitored is written to by a process, such as an application running on the computer system, a monitoring application (such as an application running on the computer system that monitors changes to files) accesses the file to determine what has changed in the file. However, as previously described, file handle locking problems might occur in some operating systems because the application writing to the file assumes that it is the only process accessing that file. For example, one such conflict occurs in the following scenario. Suppose process A, a user mode process running on a computer system, is writing to a file. Process A accesses the file with a file handle, writes to the file, and then closes the file and releases the file handle. A monitoring application (another user mode process running on the computer system) accesses the file to record the changes to the file. Meanwhile, process A, which continues to run, uses the same file name in an attempt to open a file and start writing to the file. But process A's attempt to open the file fails because there is a file handle opened with the same name from the monitoring application. Thus, process A is prevented from accessing the file it needs to write to because the file handle for the file is opened and being used by another process (the process associated with the file monitoring).

Embodiments of the invention are directed to systems and methods for file monitoring, which bypass file handle use, as it pertains to file monitoring and tailing, by obtaining information needed for monitoring from the kernel mode. In particular, embodiments of the invention utilize a file system filter driver architecture of operating systems, such as File System Filter Manager of the Microsoft Windows® operating systems. Using this architecture, an embodiment of the invention uses a specially designed file system filter (a kernel filter driver) to access the I/O path. Working with the file manager, the kernel filter driver detects write operations being performed on the files that are being monitored. The kernel filter driver then copies the write-data and places it in a kernel buffer. There the write-data can be pulled by a user mode monitoring process, which may process the data and feed it to a monitoring application. In this way, a user mode process (e.g., process A in the example above) writing the data to the monitored file is unaware that the file is even being examined. Moreover, embodiments of the invention remove the need for coordination between the monitoring process and the process A (or any other user mode process, including many third-party applications and OS components that cannot be changed) because the monitored information is obtained in the kernel mode.

Some embodiments of the invention include functionality for monitoring multiple files. In particular, a stream of file-write information obtained from the I/O path in the kernel may be de-multiplexed into separate streams, each corresponding to one of the monitored files. In one embodiment, identifying information, such as a source or index tag identifying the particular file being written to, is associated with each block of data corresponding to a file-write event in the stream of file-write information.

Turning to FIG. 1, an example of an operating environment suitable for implementing embodiments of the invention is provided and referenced generally as environment 100. Example environment 100 depicts an example of a layering model of an operating system, such as Microsoft Windows®, including an I/O stack. Environment 100 includes a user mode 101, which typically supports user applications including most file monitoring applications, and a kernel mode 102, which typically supports system-level functions. As shown in FIG. 1 (and FIGS. 2-3), a straight dashed line 103 is used to indicate those components or processes operating in user mode and those operating in kernel mode. (Components or processes operating in user mode interact with processes running in the kernel as shown by arrows crossing over the dashed line.) The arrows shown in FIG. 1 are intended to show a general direction of information flow for an example I/O request and not the direction of communication, which can be bidirectional.

As shown in environment 100, when a user mode application or process (e.g., example process A, from above) issues a system call for a file I/O (for example, reading a file or writing to a file), a file I/O request 105 is received by the I/O manager 120. In response to receiving the request for file I/O 105, I/O manager 120 creates an I/O request in the form of an I/O Request Packet (IRP), which describes the I/O request. I/O manager 120 uses this message-passing architecture for I/O related activity in the kernel, and routes IRPs from one I/O stack component to another. For example, I/O manager 120 ultimately routes I/O requests (such as Read-File and WriteFile operations) to the appropriate file system driver 140 filter driver (e.g., kernel filter driver 150), and/or storage device driver (e.g., storage driver stack 144), which operates the logical volume of hardware 145.

In the example of an I/O request shown in FIG. 1, after receiving a user request for file I/O 105, I/O manager 120 forwards the request (as an IRP) to the file system. Filter manager 130, which sits between I/O manager 120 and filter system driver 140, can intercept the I/O requests coming from I/O manager 120. Filter manager 130 manages file system filters, such as minifilter drivers. These filters, which can register with the filter manager 130, may be implemented to receive information about only specific I/O operations. In this case, filter manager 130 intercepts the I/O request and, based on the I/O request, calls an appropriate registered filter driver. For example, in an embodiment, filter manager 130 intercepts a file-write request and calls kernel filter driver 150 (described below), which is embodied as a file system filter. The I/O request continues to file system driver 140, which processes and forwards the request to storage driver stack 144, which prepares the request for hardware 145, where, in this example, the file is actually written to.

Embodiments of kernel filter driver 150, which may be embodied as a minifilter driver, comprises a specially designed filter driver for performing transparent, no-file-handle monitoring of files. In one embodiment of the invention, kernel filter driver 150 is a self-contained, data-driven driver that is loaded by filter manager 130 into the I/O stack where it watches for file-write operations to files being monitored. In this embodiment, kernel filter driver 150 passes through every I/O request, with no adulteration. As such, the kernel filter driver 150 may be considered transparent and passive.

At a high level, once a file-write I/O request is detected, kernel filter driver 150 checks whether the file write is directed towards a monitored file. If it is not, then kernel filter driver 150 simply passes through the I/O request. On the other hand, if kernel filter driver 150 detects that the file write is for a file being monitored, then in an embodiment, the kernel filter driver 150 snoops (or copies without affecting) file-write information from the file-write request, which may be an IRP, and stores this information in a buffer in the kernel (such as kernel queue 360 of FIG. 3), which may be embodied as a kernel queue. In an embodiment, the file-write information includes the file name of the file to be written to, the file offset, and the data to be written to the file (i.e., the payload). Kernel filter driver 150 continues watching I/O requests for file writes to monitored files and, upon detecting such requests, copying the file-write information from those file-write requests to the kernel buffer.

From this kernel buffer, a user mode processing engine 110 pulls portions of the file-write information, where it may be processed and provided to a monitoring application. In an embodiment, user mode processing engine 110 comprises a child process of a monitoring application running on the computer system, such as a Splunk® indexing engine, developed by Splunk Inc., of San Francisco, Calif. In some embodiments, user mode processing engine 110 performs preprocessing on the file-write information before feeding it to a monitoring application, such as deduplicating the information or multiplexing it, as further described in connection to preprocessing component 320 of FIG. 3. Additional details of embodiments of kernel filter driver 150 and user mode processing engine 110 are provided in connection to FIGS. 2 and 3.

Figure 2:
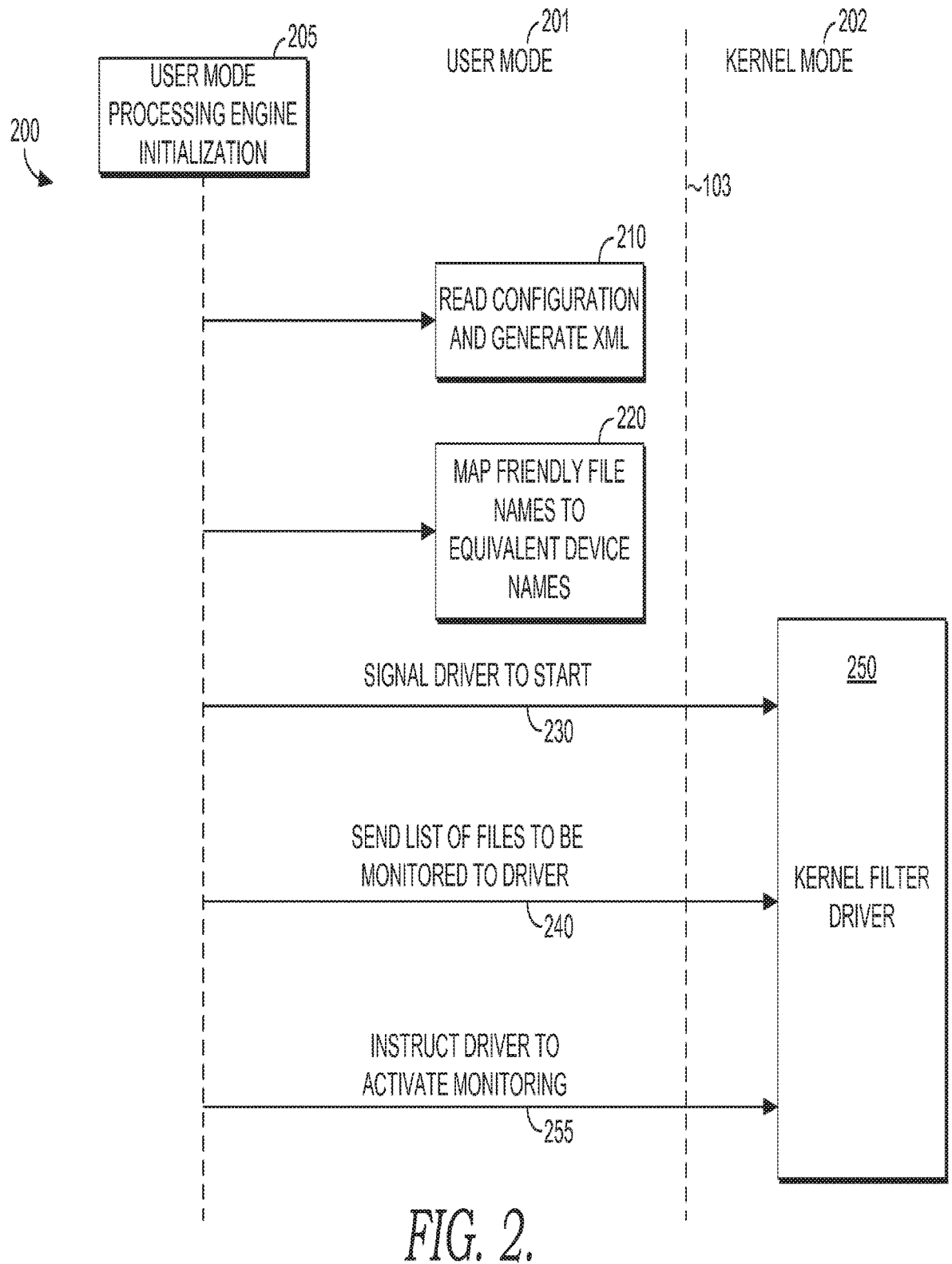
FIG. 2 is a block diagram depicting an initialization flow, in accordance with embodiments of the present invention.

Turning now to FIG. 2, a block diagram depicting an example information flow for initializing an embodiment of a file monitoring system is shown and referenced generally as initialization flow 200. Initialization flow 200 is an example of one suitable process for initializing a kernel filter driver, in accordance with embodiments of the invention. Initialization flow 200 includes a user mode 201 aspect, which typically supports user applications including a user mode processing engine, and a kernel mode 202 aspect, which typically supports system-level operations including kernel driver 150, such as described in FIG. 1. As in FIG. 1, a straight dashed line 103 is used to indicate those components or processes operating in user mode 201 and those operating in kernel mode 202.

The example initialization flow 200 begins with initialization block 205. At block 205, a user mode processing engine, such as user mode processing engine 110 of FIG. 1, receives configuration information specifying files to be monitored. In an embodiment, the configuration information may be received from a monitoring application and may be in the form of a configuration file listing the files to be monitored. For example, a user administrator may decide which files to monitor and register those files in a configuration file, which is provided to the user mode processing engine. In one embodiment, the administrator identifies one or more files to be monitored, for example, c:\logs\dns.log, and in one embodiment, the administrator further associates a source tag with the file, such as "dns log" or with the file path. The source tag may be used for differentiating different files when monitoring multiple files, such as described in connection to preprocessing component 320 of FIG. 3.

At step 210 of initialization flow 200, the configuration file is read, and in one embodiment, an XML listing is generated indicating the file names of the files to be monitored. Alternatively, the file names of the files to be monitored are extracted from the configuration file. At step 220, the file names of the files to be monitored are translated (or mapped) to their corresponding device names, which are used in file I/O requests by the operating system. In particular, in some embodiments, the file names listed in the configuration file are listed according to a friendly file name format or file namespace, such as c:\logs\dns.log, as opposed to a corresponding device namespace format, such as \device\hardisk1\partition2\windows\dns.log, which is a less user-friendly file identification that indicates the specific location of a file on a hardware device. Some embodiments of the invention may perform this translation in the kernel, as file-write I/O requests are detected; however, because kernel processing is more valuable, it is advantageous to perform the translation in the user mode rather than the kernel mode. (Additionally, by mapping the names in step 220, the translation only needs to be performed once per file to monitor rather than every time a file-write I/O request is observed by the kernel filter driver.)

At step 230, the user mode processing engine signals the kernel filter driver 250 to start. Kernel filter driver 250 may be embodied as kernel filter driver 150 described in connection to FIG. 1. In an embodiment, if the kernel filter driver 250 is already running, then at step 230, the user mode processing engine connects to it and proceeds to step 240. If the kernel filter driver 250 has not been started, then at step 230, the filter manager (not shown) loads kernel filter driver 250.

At step 240, the file names to be monitored are passed to the kernel filter driver 250. In an embodiment, the kernel filter driver 250 maintains the received file names as a list of files to be monitored, and may add the list received at step 240 to an already existing list maintained by the kernel filter driver 250. In an embodiment, the set of file names comprises a list, which may be communicated to kernel filter driver 250 as an I/O request.

At step 255, kernel filter driver 250 is instructed to start monitoring. In particular, kernel filter driver 250 monitors file-write requests for the files specified in its list. Accordingly, following step 5, kernel filter driver 250 is initialized and is running on the I/O stack looking for file-write operations for the monitored files.

Figure 3:
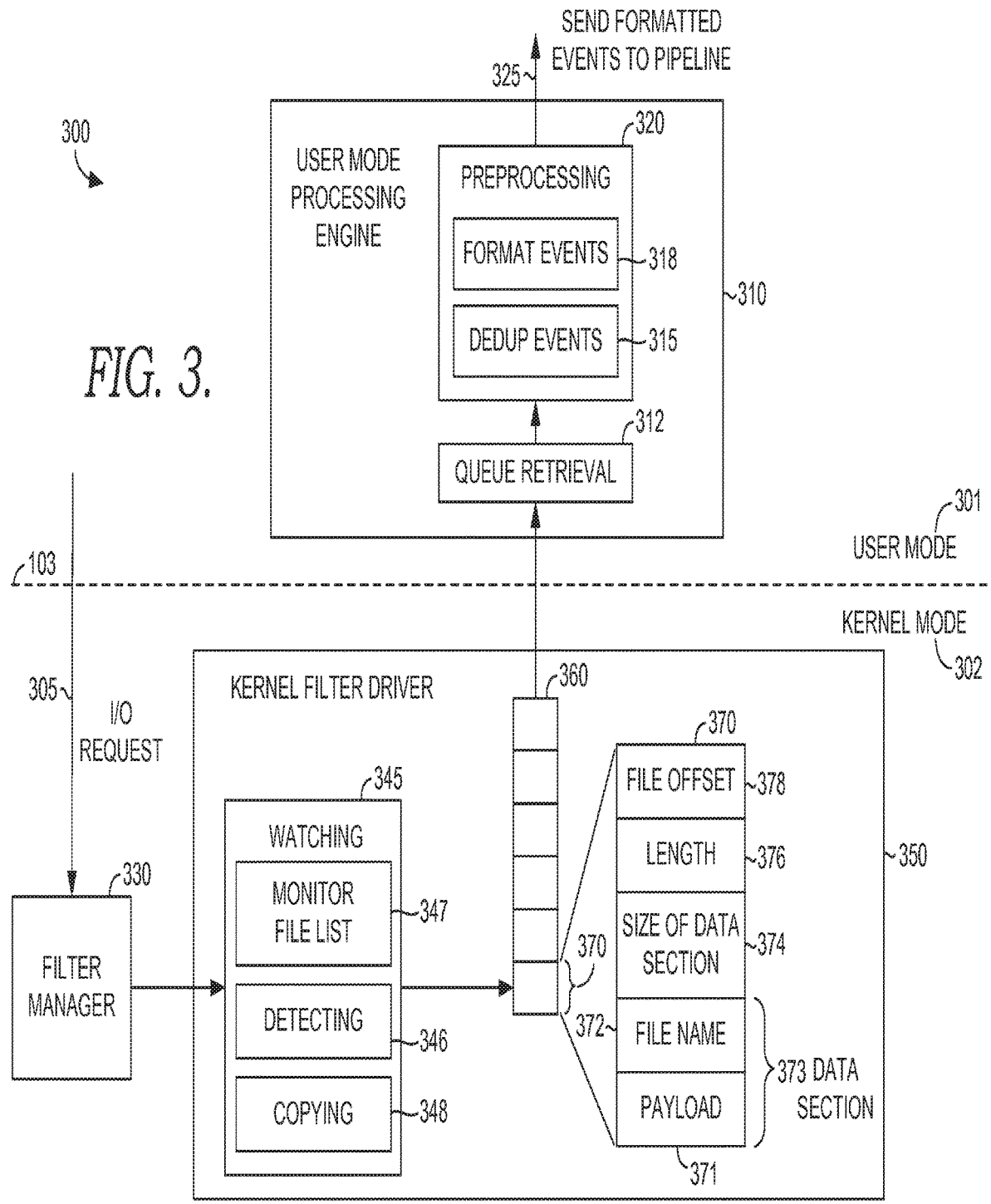
FIG. 3 is a block diagram showing a system for facilitating file monitoring, in accordance with an embodiment of the invention.

Turning now to FIG. 3, an example system for facilitating file monitoring is shown and referenced generally as system 300. System 300 includes a user mode aspect 301 and a kernel mode aspect 302, such as described in connection to FIG. 1. As in FIG. 1, a straight dashed line 103 is used to indicate those components or processes operating in user mode 301 and those operating in kernel mode 302. The arrows shown in FIG. 3 are intended to show a general direction of information flow for an example I/O request and not the direction of communication, which may be bidirectional.

As described in FIG. 1, when a user mode application issues a system call for a file I/O (for example, reading a file or writing to a file), a file I/O request is received by an I/O manager (such as I/O manager 120), which generates an I/O Request Packet (IRP) and routes the request to the appropriate file component. As shown in FIG. 3, the I/O request 305 is intercepted by a filter manager 330, which may be embodied as filter manager 130 of FIG. 1. Filter manager 330 loads kernel filter driver 350, as described in FIG. 2.

Kernel filter driver 350 may be embodied as kernel filter driver 150, described in FIG. 1, and in one embodiment takes the form of a minifilter driver specifically programmed for carrying out the processes described herein. In an embodiment, kernel filter driver 350 observes I/O requests as they pass through the I/O stack, and in particular, it examines file-write requests to determine whether the request is meant for a file that is being monitored. In one embodiment, kernel filter driver 350 does not reject or alter the file-write requests (or other I/O requests) as they pass through the I/O stack. Thus, kernel filter driver 350 may be considered transparent and passive, in such embodiments.

As shown in system 300, I/O requests are received by kernel filter driver 350 at a watching component 345. Watching component 345 is generally responsible for observing I/O requests on the I/O stack and, upon detecting a file-write request for a file being monitored, copying file-write information from the file-write request. In an embodiment, only file-write requests are acted upon; every other type of I/O request is ignored by watching component 345 (or more generally, every other type of I/O request is ignored by kernel filter driver 350). In an embodiment, watching component 345 includes a monitor file list 347, a detecting component 346, and a copying component 348.

Embodiments of monitor file list 347 comprise a listing of one or more file names corresponding to files to be monitored. In an embodiment, the file names are specified in the device namespace format used in the file I/O request (as opposed to a friendly file namespace format). Monitor file list 347 is used by kernel filter driver 350 for determining from which file-write operations (those corresponding to file-write requests on files specified in the monitor file list), file-write information should be copied and made available to user mode processing engine 310. For example, monitor file list 347 may be used by detecting component 346, for determining which file-write operations should be copied, as described below.

Detecting component 346 is generally responsible for detecting a file-write I/O request for a file that is specified in monitor file list 347. In one embodiment, every file-write I/O request is examined by detecting component 346. As described above, I/O requests may take the form of an IRP, which may completely describe the I/O request, including, in the case of a file-write request, the file name of a file to be written to. In particular, IRPs may include a file name field specifying the file name of the file to be written to. In an embodiment, detecting component 346 obtains the file name from the file name field of file-write IRP requests and performs a comparison, such as a pattern match, between the IRP file name and the file names in monitor file list 347. In one embodiment, a string comparison is performed on the file name from the IRP file name field and the file names in monitor file list 347.

In embodiments wherein the file names of monitor file list 347 include friendly file names that have not yet been translated to the device namespace format used by I/O requests, detecting component 346 may first translate the file names before performing the comparison. However, as described in connection to FIG. 1, it may be advantageous to perform this translation ahead of time in user mode (or otherwise in user mode), because processing the translations in kernel mode is more computationally expensive, as kernel resources (e.g. CPU time) are an expensive commodity.

Copying component 348 is generally responsible for copying information from an IRP and storing the information in a kernel buffer, such as kernel queue 360. When detecting component 346 determines a match between the file name in the IRP and a file name in the monitored file list 347, file-write information is copied from the IRP by copying component 348. In some embodiments, the file-write information copied by copying component 348 comprises the file name (i.e., the name of the target file to be written to, as specified in the IRP), the file offset, and the data to be written to the file (i.e., the payload). The payload and file name may be referred to as the "data section" of the file-write information, such as data section 373 shown in FIG. 3. The file-write information may be copied out of the IRP without affecting the IRP, which may be referred to as snooping (copying without affecting).

Copying component 348 stores the copied file-write information in a kernel buffer, such as kernel queue 360, which may be implemented in a kernel buffer as a first-in-first-out (FIFO) queue, in an embodiment. (For example, the file-write information may be stored at the tail end of kernel queue 360, as shown in block 370.) In an embodiment, the file-write information is stored in the tail of kernel queue 360. More specifically, in one embodiment, kernel queue 360 is implemented as a linked list data structure, such as a forward linked and backward linked list, sometimes referred to as a Flink and Blink. Thus, in one embodiment, the data stored in kernel queue 360 is opaque. File-write information is put on the kernel queue 360 as a block of information preceded by a Flink and a Blink (not shown) corresponding to other blocks of file-write information that have been put on kernel queue 360 or the list head.

Block 370 of kernel queue 360 illustratively depicts one example of a block of file-write information copied from an IRP file-write request to a monitored file and stored in kernel queue 360. The file-write information in block 370, which corresponds to a file-write request, may be referred to as a file-write event (or just event). Example block 370 includes the file name 372 and the payload 371 (together referred to as the data section 373), and the file offset 378. In an embodiment, kernel filter driver 350 determines, from the copied file-write information, the length of the file-write information (length 376) and the size (374) of the data section 373. This information may be stored in block 370, in one embodiment.

In some embodiments, kernel filter driver 350 (or more specifically, watching component 345) continues to add file-write information for monitored files to the tail of kernel queue 360, where it sits until it is retrieved by user mode processing engine 310. User mode processing engine 310, which may be embodied as user mode processing engine 110 of FIG. 1, pulls portions of file-write information from kernel queue 360, processes the information and, thereafter, can provide it to a monitoring application. In an embodiment, user mode processing engine 310 reports the processed file-write data to a monitoring application such as a Splunk® indexing engine.

An example embodiment of user mode processing engine 310 is provided in system 300 and includes a queue retrieval component 312 and a preprocessing component 320. Queue retrieval component 312 is generally responsible for pulling file-write information from the kernel queue 360 (or kernel buffer storing the file-write information for monitored files). In one embodiment, queue retrieval 312 pulls file-write data from the top or front of kernel queue 360, such as shown in example system 300. In one embodiment, user mode processing engine 310 comprises a multi-threaded design, where one thread is associated with queue retrieval 312 and one or more other threads are associated with preprocessing 320.

In one embodiment, queue retrieval 312 continually or periodically attempts to pull data from the kernel queue 360; when no data is available, queue retrieval 312 waits. In an embodiment, queue retrieval 312 makes a procedural call to the kernel, which may be in the form of a request sent through the filter manager to the kernel filter driver. In an embodiment, queue retrieval 312 specifies a buffer for the kernel filter driver to fill. In particular, the kernel filter driver writes to the location of the specified buffer and tells the user mode processing engine 310 how much it wrote to the buffer. When the specified buffer is too small for a single file-write event (i.e., the file-write information corresponding to a single file-write request), the kernel filter driver 350 may report back that the buffer is too small so that queue retrieval 312 can specify a larger buffer. In one embodiment, queue retrieval 312 specifies a very large buffer, such that the kernel driver writes as many file-write events into the buffer without overflowing it. In this embodiment, queue retrieval 312 then proceeds through the received large buffer processing each file-write event.

Although queue retrieval 312 is described as retrieving or pulling file-write information from kernel queue 360 (or a kernel buffer, in some embodiments), other alternatives are contemplated as being within the scope of the invention. For example, queue retrieval 312 may be provided file-write information, the file-write information may be pushed to queue retrieval 312, or queue retrieval 312 might otherwise receive the file write information from kernel queue 360.

In one embodiment, upon receiving file-write information from the kernel queue 360, queue retrieval 312 provides the file-write information to preprocessing component 320. Preprocessing component 320 is generally responsible for processing the data stream retrieved from kernel queue 360 into event information corresponding to file-write events. The term "preprocessing" is used here in the sense that the output (e.g., arrow 325) of user mode processing engine may be processed (i.e. consumed) by a monitoring application, in some embodiments. It is contemplated in the scope of the invention that embodiments of component 320 perform processing. In an embodiment, preprocessing component 320 comprises dedup events component 315 and format events component 318. Although system 300 shows the dedup events 315 occurring before format events 318, in some embodiments where operations corresponding to both components are performed, the operations can be done in either order. However, as will be described below, one embodiment of the deduplication operation performed by dedup events 315 provides separate streams of data, each corresponding to a monitored file.

Dedup events component 315 is generally responsible for performing deduplication on the file-write information. Within the I/O stack, the file system might create duplicate file writes corresponding to the same single file-write event. For example, as the IRP request traverses the I/O stack, sometimes the data to be written to a file may be cached, and then later regenerated. The kernel filter driver, sitting in the stack, ends up capturing file-write information for the same file-write event more than once. Therefore, the file-write information provided by queue retrieval 312 may contain duplicate entries of file-write information corresponding to the same file-write event.

In an embodiment, dedup events 315 performs deduplication on a per file basis across as many different files as are being monitored. At a high level, the file-write information for an event, from successive events of file-write information in the stream of data provided by queue retrieval 312, is compared to determine duplicate event entries. For example, where two recent entries have the same file name (corresponding to the same file to be written to), then the combination of the payload and file offset may be examined to determine duplication. In one embodiment, where file offset and a hash of the payload of a first entry of time write information matches the file offset and hash of a second entry of time write information, having the same file name and within a time frame, then it is likely that there is duplication, and the second entry may be discarded. However, if the hash is different, for example, then the data being written is different (even though the file name and file offset may be identical), which indicates a non-duplicate file-write event.

Figure 7:
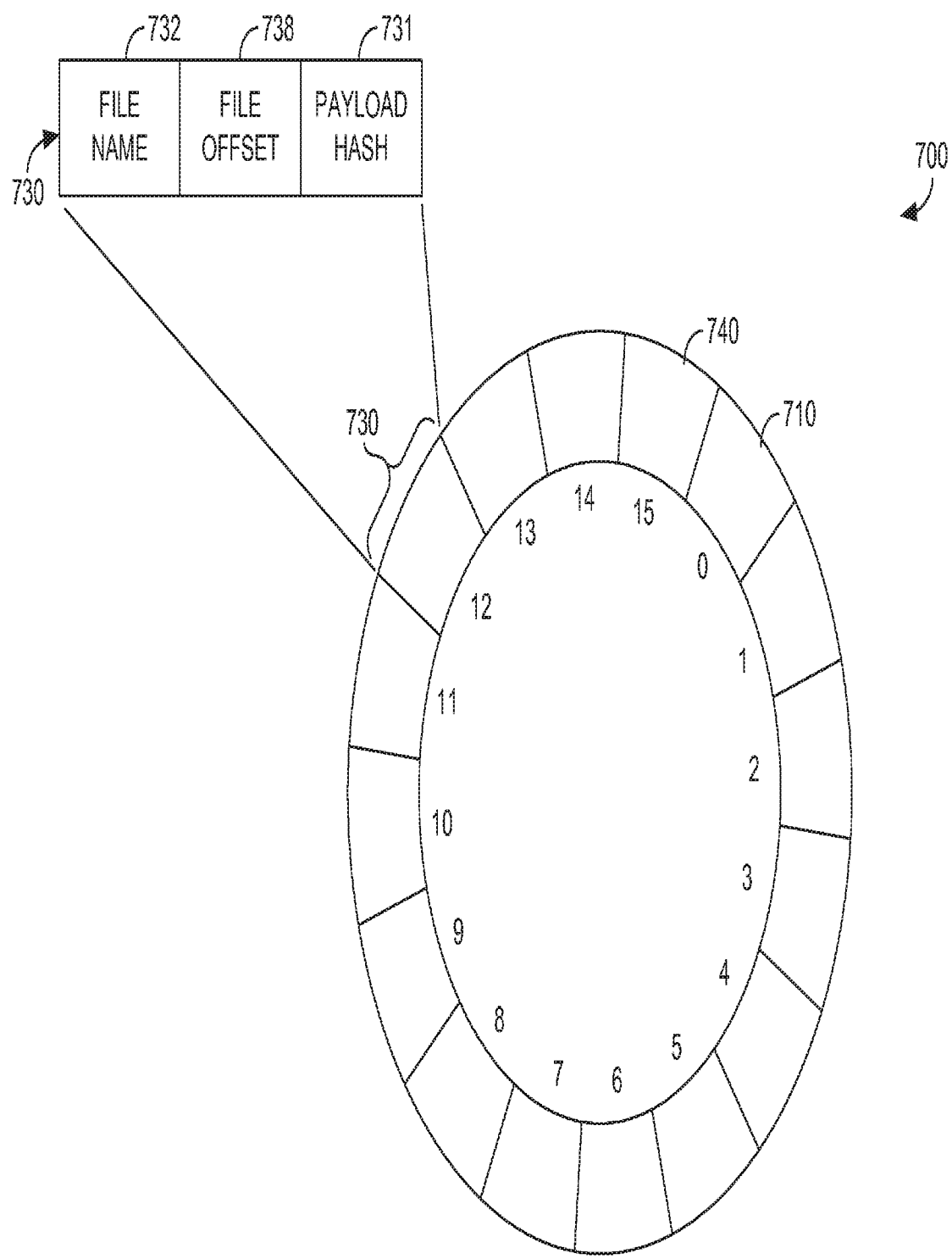
FIG. 7 is a block diagram depicting a circular buffer of three-tuples for facilitating deduplication of file-write events for a monitored file, in association with an embodiment of the invention.

In particular, in one embodiment, as each block of file-write information (e.g., block 370) corresponding to an event is received by queue retrieval 312, a hash is performed on the payload data 371. In one embodiment, the hash comprises an SH1 hash. Using a three-tuple (such as example three-tuple 730 shown in FIG. 7) from each block of file-write information comprising the file name, file offset, and hash of the payload, a comparison is made to three-tuples from previous file-write events having the same file name and within a recent time frame. A match indicates a likely duplicate file write. With reference to FIG. 7, a depiction of one example of a three-tuple 730 is shown. Example Three-tuple 730, which is discussed below, includes file name 732 and file offset 738 information and a hash of the payload.

In one embodiment, a circular buffer or queue is created (or maintained) corresponding to each file name from the three-tuples. Thus, each circular queue will correspond to one of the files being monitored. With continuing reference to FIG. 7, an example circular queue 700 is shown suitable for use by dedup events 315 for performing deduplication on a monitored file. Circular queue 700 stores three-tuples (such as three-tuple 730) corresponding to recently received blocks of file-write information for a monitored file. In an alternative embodiment, a circular queue stores the recently received blocks (rather than just three-tuples) of file-write information for a particular file name. The size of circular queue 700 may be based on the rate of file-write information retrieved by queue retrieval 312. In this example embodiment, circular queue 700 comprises the last 16 three-tuples (or in an alternative embodiment, the last 16 blocks of file-write information for a particular file name) including a head three-tuple 710 and a tail three-tuple 740.

In some embodiment such as the example shown in FIG. 1, circular queue 700 is implemented as a FIFO buffer. As new file-write information entries are added to tail of the circular queue 700 (e.g., tail three-tuple 740), the older entries are pulled from the head of circular queue 700 (e.g., head three-tuple 710) and maybe provided to format events 318 for additional preprocessing or provided to a monitoring application (as shown by arrow 325 in FIG. 3). Thus, in the example of FIG. 7, a three-tuple corresponding to the most recent block of file-write information is stored at the tail position corresponding to tail three-tuple 740.

With reference to FIGS. 3 and 7, in one embodiment, using a circular queue, such as circular queue 700, dedup events 315 compares a three-tuple of a first block of file-write information (corresponding to a recently received file-write event) against the entries in a circular queue 700 corresponding to file-write information for the same file name. If a match is detected within a time frame, such as two to three seconds, in one embodiment, then dedup events 315 determines a likely duplication, and one of the duplicate entries is removed. However, when a match is detected outside the specified time frame, dedup events 315 assume that the match corresponds to a new file-write event.

Returning to FIG. 3, and continuing with preprocessing component 320, format events component 318 is generally responsible for multiplexing the single data stream of file-write information provided by queue retrieval 312 into separate data streams, such that each stream corresponds to a separate file-write event source (i.e., a separate stream of file-write data for each file being monitored). In this way, the monitoring application can monitor changes to more than one file on the computer system. Because (in some embodiments) the kernel queue includes file-write information for all files being monitored, where more than one file is being monitored, that information must be separated out according to the source (i.e., according to the monitored file being written to).

In the embodiment of user mode processing engine 310 shown in example system 300, format events component 318 receives deduplicated file-write information from dedup events 315, which includes the output of each circular buffer as it is replaced with a new block of file-write information for a file-write event. Accordingly, in this embodiment, the file-write information received by format events 318 is already separated by file name. In other embodiments, format events 318 multiplexes the data stream by using the file name information, from each block of file-write event information, to identify the file-write event source.

In some embodiments, format events 318 also identifies and labels each data stream or block of file-write information for a particular monitored file. For example, in one embodiment, data is labeled with a source tag based on the file name, thereby associating the block of file-write information with a particular source (i.e., a particular file being monitored). In one embodiment, source tags are specified in a configuration file received by user mode processing engine 310 during initialization, such as described in connection to FIG. 2, and may be determined by a system administrator. In this way, format events 318 provides a stream of formatted events of file-write events for each file being monitored, which may be labeled (or tagged) according to their source.

Following preprocessing 320, user mode processing engine 310 provides formatted event information at arrow 325, which may be provided to a monitoring application, such as a Splunk® indexing engine. In embodiments of system 300 where preprocessing is performed, the preprocessing may be performed in the kernel mode, such as within the kernel filter driver, rather than user mode processing engine 310. However, as previously described it may be advantageous to perform this processing in the user mode because processing in kernel mode is computationally expensive.

With reference to FIGS. 1-3, some of the components depicted in these drawings may be embodied as a set of compiled computer instructions or functions, program modules, computer software services, or an arrangement of processes carried out on a computer system, such as computing device 600 described in connection to FIG. 6, for example. Alternatively, or in addition, the functionality of these components and/or embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Figure 4:
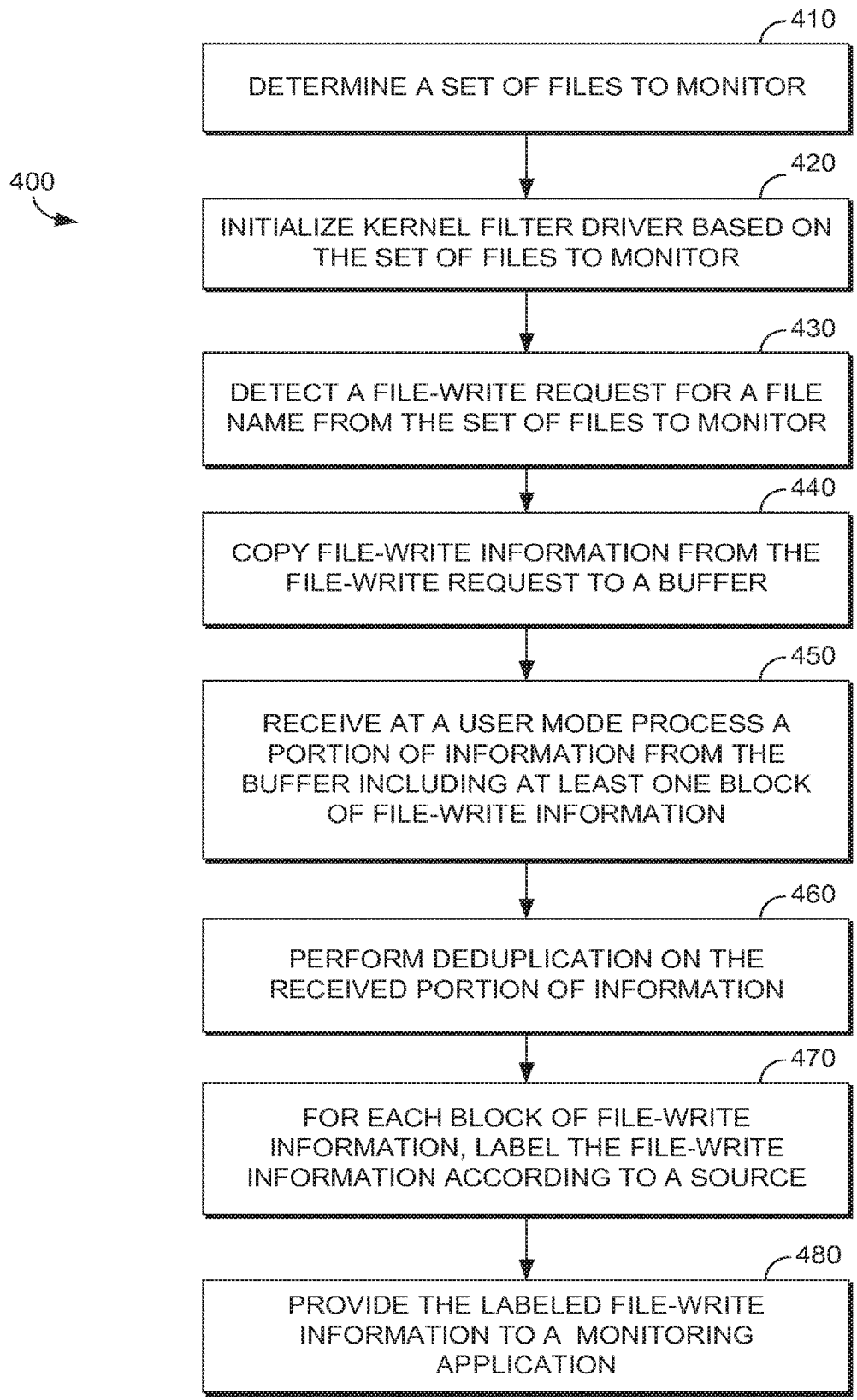
FIG. 4 is a flow diagram showing a method for file monitoring, in accordance with an embodiment of the present invention.

Turning now to FIG. 4, a flow diagram is provided illustrating one exemplary method 400 for monitoring one or more files without using a file handle. Embodiments of method 400 may be carried out using the components and processes described in connection to FIGS. 1-3 on a computing device such as computing device 600 of FIG. 6. Initially, at step 410, method 400 determines a set of one or more files to monitor. In an embodiment, a set of files to monitor is determined according to a configuration file, such as described in connection to FIG. 2. In one embodiment, the files to be monitored are specified in a configuration file provided to a user mode process by a file monitoring application. The files in the configuration file may have been specified by a system administrator or a monitoring routine or component of a file monitoring application.

At step 420, a kernel filter driver is initialized based on the set of files to monitor. In one embodiment, a kernel filter driver is initialized as described in connection to FIG. 2. The kernel filter driver may be embodied as a minifilter driver that attaches to the I/O path of a computer system and may be configured for accessing file-write information on an I/O path of a computer system.

Step 420 comprises communicating the file names of the files to be monitored to a kernel filter driver, which stores the file names in a data structure such as monitor file list 347 of FIG. 3. The file names from the set of files to be monitored may be communicated to the kernel filter driver via an I/O request. The file names specified in the set of files to be monitored may be translated from a friendly file namespace to a device namespace and communicated to the kernel filter driver, in some embodiments, such as described in step 2 of FIG. 2. Further, some embodiments of step 420 may comprise loading the kernel filter driver, which may be performed by a filter manager, if the kernel filter driver is not already loaded, and/or instructing the kernel filter driver to activate monitoring, once the file names have been communicated.

At step 430, a file-write I/O request for a file name in the set of files to monitor is detected. In an embodiment of step 430, the kernel filter driver observes file-write requests on the I/O stack and compares the file names specified in I/O request packet (IRP) to the file names in the list of files to monitor communicated in step 420, such as described in connection to FIG. 3. In an embodiment, this comparison comprises a string comparison of the file name. In some embodiments of step 430, the kernel filter driver ignores or passes on I/O requests other than file-write requests (except I/O requests that are sent to the kernel filter driver, such as the I/O request that communicates the file names in step 420).

At step 440, file-write information from the file-write request detected in step 430 is copied to a kernel buffer. In an embodiment, the file-write information copied from the file-write request comprises the file name, file offset, and file-write data (i.e., the payload), and may be referred to herein as a block of file-write information, such as block 370 described in connection to FIG. 3. Accordingly, a block of file-write information comprises file-write information corresponding to a file-write event.

Embodiments of step 440 may be performed by a copying component of the kernel filter driver, such as described in connection to copying component 348 of FIG. 3. In an embodiment, the kernel buffer comprises a kernel queue, which may be implemented as a FIFO queue, and the file-write information is put in the tail of the queue. Further, in one embodiment, the kernel queue is implemented as a linked list data structure, such as a forward linked and backward linked list, sometimes referred to as a Flink and Blink. In this embodiment, the file-write information may be placed on the kernel queue as a block of information preceded by a Flink and a Blink corresponding to other blocks of file-write information placed on the kernel queue or the list head. In one embodiment, the kernel filter driver determines the length of the file-write information block and the size of the data section portion of the block (i.e., the file name and payload) and stores this information as part of the block, in the kernel buffer, such as described in connection to block 370 of FIG. 3.

At step 450, a portion of information from the kernel buffer comprising at least one block of file-write information is received at a user mode process. The at least one block of file-write information corresponds to at least one file-write event for a monitored file, detected from a file-write request. In some cases, the portion of information comprises a stream or sequence of file-write information blocks, which may be received from the kernel buffer and cached in the user mode process for further processing, according to an embodiment.

In one embodiment, the user mode process comprises a user mode processing engine as described in connection to user mode processing engine 110 of FIG. 1 and 310 of FIG. 3. In one embodiment, the portion of information may be received from the kernel buffer as described in connection to queue retrieval component 312 in FIG. 3. For example, in one embodiment, the portion of information is "pulled" from a kernel queue by the user mode process.

At step 460, deduplication is performed on the received portion of information. As described previously, within the I/O stack, a file system can sometimes create duplicate file writes corresponding to the same single file-write event, which may result in duplicate blocks of file-write information in the portion of information received at step 450.

Embodiments of step 460 may perform deduplication such as described in connection with dedup events component 315 of FIG. 3. In particular, in an embodiment, deduplication is performed on a per file basis across as many different files as are being monitored. In one embodiment, from each block of file-write information, in the portion of file-write information received in step 450, a hash, such as an SH1 hash, is performed on the payload data, and a three-tuple is formed comprising the file name, file offset, and hash of the payload. The three-tuple may be stored in a circular queue, such as described in FIG. 3. A comparison is performed between three-tuples from file-write events having the same file name, in the circular buffer, and within a recent time frame. A match indicates a likely duplicate file write, which may then be discarded.

More specifically, in one embodiment, using circular queues corresponding to each file being monitored, step 460 compares a three-tuple of a first block of file-write information (corresponding to a recently received file-write event) against the other entries in a circular queue for that same file name. If a match is detected within a time frame, such as two to three seconds in one embodiment, then step 460 determines a likely duplication, and one of the duplicate entries is removed. However, where a match is detected outside the specified time frame, then step 460 assumes that the match corresponds to a new file-write event.

At step 470, for each block of file-write information in the portion of information received in step 450, the block is labeled according to a source of the file-write event, for example, a label indicating the monitored file for which the file-write information corresponds. Embodiments of step 470 may be carried out as described in connection to format events component 318 of FIG. 3. In an embodiment of step 470, each block is labeled with a source tag based on the file name specified in the block, thereby associating the block of file-write information with a particular source (i.e., a particular file being monitored). Further, in one embodiment, source tags are specified in the configuration file determined in step 410, such as further described in connection to FIG. 2.

At step 480, the labeled file-write information is provided to a monitoring application. Embodiments of step 480 may provide the labeled file-write information to a file monitoring application such as a Splunk® indexing engine. The labeled file-write information may be provided such as described in connection to FIG. 3.

Figure 5:
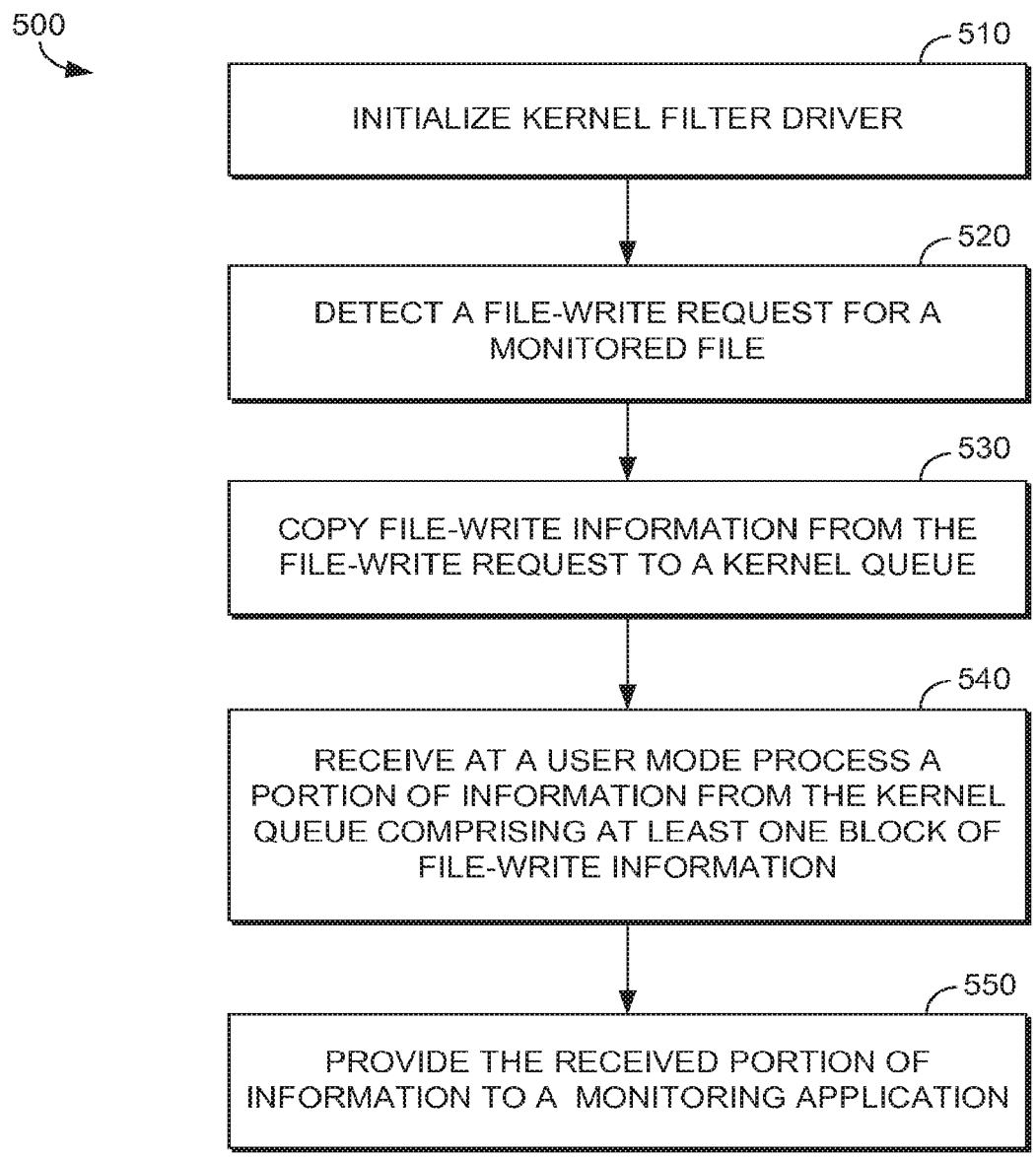
FIG. 5 is a flow diagram showing another method for file monitoring, in accordance with an embodiment of the present invention.

Turning to FIG. 5, a flow diagram is provided illustrating another exemplary method 500 for monitoring a file without using a file handle. Embodiments of method 500 may be carried out using the components and processes described in connection to FIGS. 1-3 on a computing device such as computing device 600 of FIG. 6. Initially, at step 510, a kernel filter driver is initialized. In one embodiment, a kernel filter driver is initialized as described in connection to FIG. 2. For example, the kernel filter driver may be embodied as a minifilter driver that attaches to the I/O path of a computer system and may be configured for accessing file-write information on an I/O path of a computer system.

In one embodiment, step 510 comprises communicating the file name of a file to be monitored to the kernel filter driver, which stores the file name in a data structure such as monitor file list 347 of FIG. 3. The filename may be communicated to the kernel filter driver via an I/O request, in one embodiment. Alternatively, in one embodiment, the kernel filter driver may be preconfigured (or designed) with the file name. Initially, the file name of the file to monitor may be specified in a configuration file, such as described in FIG. 2. Additionally, in an embodiment, the file name may be translated from a file namespace to a device namespace, such as described in step 2 of FIG. 2. Some embodiments of step 510 may comprise loading the kernel filter driver, which may be performed by a filter manager, if the kernel filter driver is not already loaded, and/or instructing the kernel filter driver to activate monitoring, once the file name has been communicated.

At step 520, a file-write I/O request for the file name of a file to monitor is detected. In an embodiment of step 520, the kernel filter driver observes file-write requests on the I/O stack and compares the file names specified in the I/O request packet (IRP) to the file name of a file to monitor, which may have been communicated in step 510. In an embodiment, this comparison comprises a string comparison of the file name. In some embodiments of step 520, the kernel filter driver ignores or passes on I/O requests other than file-write requests (except I/O requests that are sent to the kernel filter driver, such as the I/O request that communicates a file name in step 510).

At step 530, file-write information from the file-write request detected in step 520 is copied to a kernel buffer such as a kernel queue. In an embodiment, the file-write information copied from the file-write request comprises the file name, file offset, and file-write data (i.e., the payload), and may be referred to herein as a block of file-write information, such as block 370 described in connection to FIG. 3. In another embodiment, the file-write information comprises at least the file-write data (i.e., the payload) and may also comprise the file offset. Accordingly, a block of file-write information comprises file-write information corresponding to a file-write event. Some embodiments of step 530 may be performed such as described in step 440 of method 400.

At step 540, a portion of information from the kernel buffer comprising at least one block of file-write information is received at a user mode process. The at least one block of file-write information corresponds to at least one file-write event for a monitored file, detected from a file-write request. In some cases, the portion of information comprises a stream or sequence of file-write information blocks, which may be received from the kernel buffer and cached in the user mode process for further processing, according to an embodiment. Some embodiments of step 540 may be performed such as described in step 450 of method 400.

In one embodiment, the user mode process comprises a user mode processing engine as described in connection to user mode processing engine 110 of FIG. 1 and 310 of FIG. 3. In one embodiment, the portion of information may be received from the kernel buffer as described in connection to queue retrieval component 312 in FIG. 3. For example, in one embodiment, the portion of information is "pulled" from a kernel queue by the user mode process.

At step 550, the received portion of information comprising at least one block of file-write information is provided to a monitoring application. Embodiments of step 550 may provide the file-write information to a file monitoring application such as a Splunk® indexing engine. Some embodiments of step 550 may be performed such as described in step 480 of method 400.

Accordingly, we have described various aspects of technology directed to systems and methods for file monitoring in association with a computer system, which bypasses file handle use as it pertains to the file monitoring or tailing, by obtaining information needed for monitoring from the kernel. In this way, user mode processes writing data to a monitored file can remain unaware that the file is being examined, and files used from all processes may be available for monitoring, as there is no need for coordination between the monitoring process and other third-party applications or OS components. We have also described embodiments using a user mode processing engine and a kernel filter driver to obtain file-write information from the I/O path of a computer system and embodiments for monitoring multiple files.

It is understood that various features, sub-combinations, and modifications of the embodiments described herein are of utility and may be employed in other embodiments without reference to other features or sub-combinations. Moreover, the order and sequences of steps shown in the example methods 400 and 500 are not meant to limit the scope of the present invention in any way, and in fact, the steps may occur in a variety of different sequences within embodiments hereof. Such variations and combinations thereof are also contemplated to be within the scope of embodiments of the invention.

Having described an overview of embodiments of the present invention, an exemplary operating environment in which embodiments of the present invention may be implemented is described below in order to provide a general context for various aspects of the present invention. Referring to FIG. 6 in particular, an exemplary operating environment for implementing embodiments of the present invention is shown and designated generally as computing device 600. The computing device 600 is but one example of a suitable computing environment and is not intended to suggest any limitation as to the scope of use or functionality of embodiments of the invention. Neither should the computing device 600 be interpreted as having any dependency or requirement relating to any one component nor any combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

Figure 6:
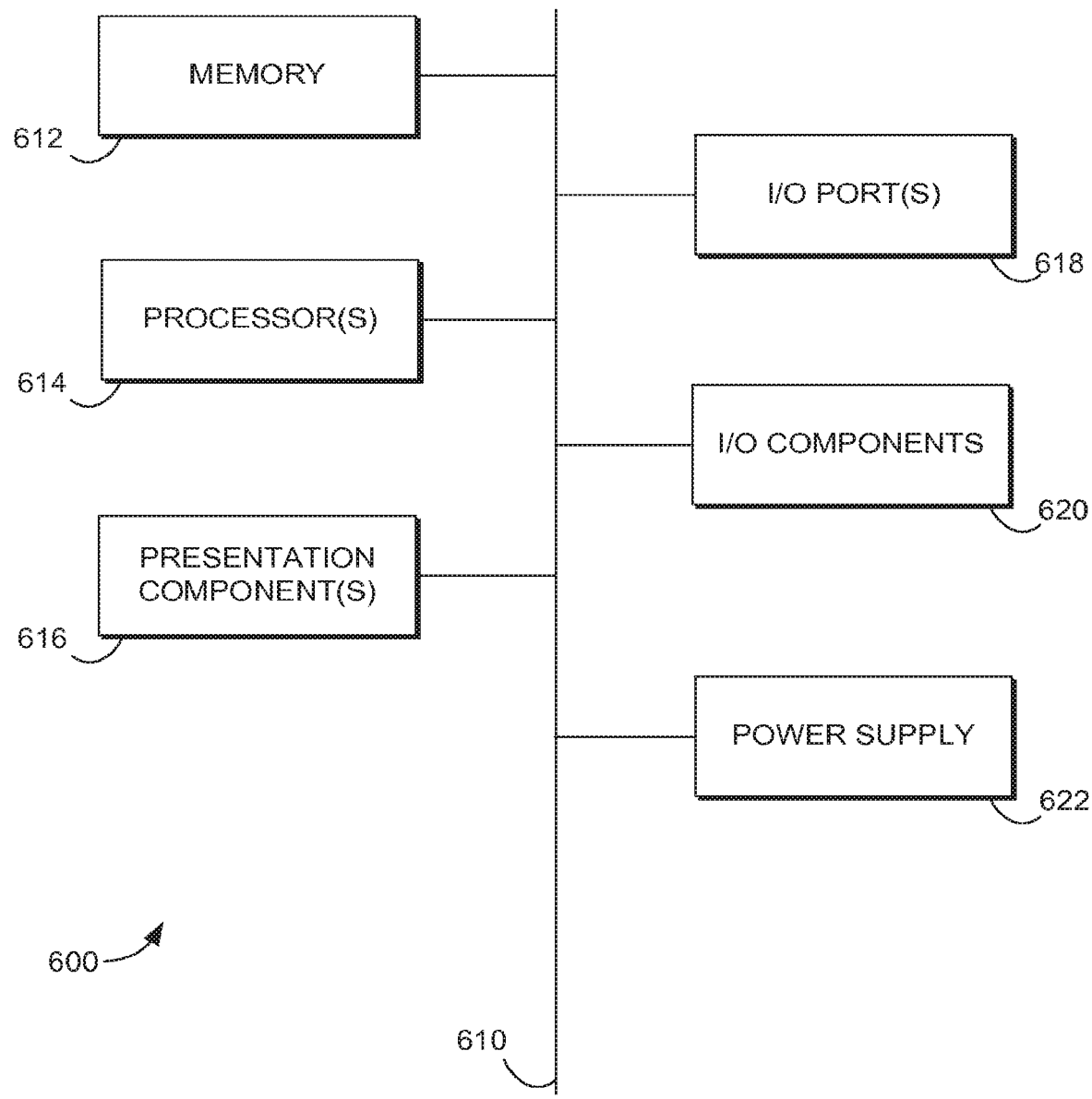
FIG. 6 is a block diagram of an exemplary computing environment suitable for use in implementing embodiments of the present invention.

With continued reference to FIG. 6, the computing device 600 includes a bus 610 that directly or indirectly couples the following devices: a memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless communication device, etc.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method for monitoring one or more files, the method comprising:
    initializing a kernel filter driver, based on a set of files, by providing to the kernel filter driver a list of file names corresponding to the set of files, the list of file names being determined from a configuration file, wherein the file names in the list of file names are translated from a file namespace format to a device namespace format;
    detecting, by the kernel filter driver, a file-write request for a file of the set of files;
    copying, by the kernel filter driver, one or more blocks of file-write information from the file-write request to a kernel buffer, the file write information corresponding to a file-write event, wherein the kernel filter driver allows the file-write request to pass through unaffected; and
    receiving, at a user mode process running a kernel buffer retrieval operation in a user mode, a portion of data from the kernel buffer comprising file-write information corresponding to at least one file-write event.

2. The method of claim 1, wherein the set of files comprises a plurality of files.

3. The method of claim 1 further comprising for each block of file-write information corresponding to one file-write event in the received portion of data, labeling the block of file-write information according to a source of the file-write event.

4. The method of claim 1 further comprising:
    for each block of file-write information corresponding to one file-write event, in the received portion of data, labeling the block of file-write information according to a source of the file-write event; and
    providing the labeled block of file-write information to a monitoring application.

5. The method of claim 1 further comprising for each block of file-write information corresponding to one file-write event, in the received portion of data, labeling the block of file-write information according to a source of the file-write event, wherein labeling the block comprises tagging the block with an identification corresponding to a monitored file targeted by the file-write event.

6. The method of claim 1, wherein each block of file-write information comprises a file name, file offset, and a write-data payload of file-write information corresponding to one file-write event, and wherein a file-write event corresponds to an I/O request to write to a particular file.

7. The method of claim 1, wherein the kernel buffer comprises a first-in-first-out queue, and the copied file-write information is placed in the tail of the queue.

8. The method of claim 1, wherein the kernel buffer comprises a first-in-first-out queue, and the copied file-write information is placed in the tail of the queue, and further comprising:
    determining the length of the copied file-write information; and
    storing the length of the copied file-write information as part of the file-write information in the tail of the queue.

9. The method of claim 1, wherein the kernel buffer comprises a first-in-first-out queue, and the copied file-write information is placed in the tail of the queue, and further comprising:
    determining the combined size of the file name and payload of the file-write information; and
    storing the combined size of the file name and payload of the file-write information as part of the file-write information in the tail of the queue.

10. The method of claim 1, wherein the kernel buffer comprises a first-in-first-out queue, and the copied file-write information is placed in the tail of the queue, and further comprising:
    determining (a) the length of the copied file-write information and (b) the combined size of the file name and payload of the file-write information; and
    storing (a) and (b) as part of the file-write information in the tail of the queue.

11. The method of claim 1, wherein the copied file-write information corresponding to a file-write event comprises at least a file name, file offset, and a write-data payload.

12. The method of claim 1, wherein the portion of data from the kernel buffer comprises at least two blocks of file-write information, each block corresponding to one file-write event, and further comprising performing deduplication on the received portion of data.

13. The method of claim 1, wherein the portion of data from the kernel buffer comprises at least two blocks of file-write information, each block corresponding to one file-write event, and further comprising:
    performing deduplication on the received portion of data; and
    providing the deduplicated portion of data to a monitoring application.

14. The method of claim 1, further comprising performing deduplication on the received portion of data, wherein the portion of data from the kernel buffer comprises at least two blocks of file-write information, each block corresponding to one file-write event, wherein each block of file-write information comprises a file name, file offset, and a write-data payload, and wherein the performed deduplication is based on a comparison of the file name, file offset, and a hash of the write-data payload for the at least two blocks.

15. The method of claim 1, further comprising performing deduplication on the received portion of data, wherein the portion of data from the kernel buffer comprises at least two blocks of file-write information, each block corresponding to one file-write event, wherein each block of file-write information comprises a file name, file offset, and a write-data payload, wherein the performed deduplication is based on a comparison of the file name, file offset, and a hash of the write-data payload for the at least two blocks, wherein the comparison is based on blocks of file-write information generated within a predetermined timeframe, and wherein a matching file name, file offset, and hash of the write-data payload indicates a duplication.

16. The method of claim 1, further comprising initializing the kernel filter driver based on the set of files, wherein initializing the kernel filter driver comprises providing to the kernel filter driver a listing of file names corresponding to the set of files.

17. The method of claim 1, wherein the portion of data from the kernel buffer received at the user mode process is pulled from the kernel buffer by the user mode process.

18. The method of claim 1, wherein the method is performed without the user mode process opening, via a file handle, the file in the set of files.

19. The method of claim 1 further comprising providing the received portion of data to a monitoring application that monitors changes to the file.

20. A system for monitoring one or more files, the system comprising:
one or more data processors; and
one or more computer-readable storage media containing instructions which, when executed on the one or more data processors, cause the one or more processors to perform operations including:
initializing a kernel filter driver, based on a set of files, by providing to the kernel filter driver a list of file names corresponding to the set of files, the list of file names being determined from a configuration file, wherein the file names in the list of file names are translated from a file namespace format to a device namespace format;
detecting, by the kernel filter driver, a file-write request for a file of the set of files;
copying, by the kernel filter driver, one or more blocks of file-write information from the file-write request to a kernel buffer, the file write information corresponding to a file-write event, wherein the kernel filter driver allows the file-write request to pass through unaffected; and
receiving, at a user mode process running a kernel buffer retrieval operation in a user mode, a portion of data from the kernel buffer comprising file-write information corresponding to at least one file-write event.

21. The system of claim 20, wherein the set of files comprises a plurality of files, and the operations further comprising:
for each block of file-write information corresponding to one file-write event, in the received portion of data, labeling the block of file-write information according to a source of the file-write event; and
providing the labeled block of file-write information to a monitoring application.

22. The system of claim 20, wherein the set of files comprises a plurality of files, and the operations further comprising:
for each block of file-write information corresponding to one file-write event, in the received portion of data, labeling the block of file-write information according to a source of the file-write event; and
providing the labeled block of file-write information to a monitoring application, wherein each block of file-write information comprises a file name, file offset, and a write-data payload of file-write information corresponding to one file-write event, wherein a file-write event corresponds to an I/O request to write to a particular file, and wherein labeling the block comprises tagging the block with an identification corresponding to a monitored file targeted by the file-write event.

23. The system of claim 20, the operations further comprising performing deduplication on the received portion of data, wherein the portion of data from the kernel buffer comprises at least two blocks of file-write information, each block corresponding to one file-write event, wherein each block of file-write information comprises a file name, file offset, and a write-data payload, and wherein the performed deduplication is based on a comparison of the file name, file offset, and a hash of the write-data payload for the at least two blocks.

24. One or more computer storage media storing computer-executable instructions that, when executed by a computing device, perform a method for monitoring one or more files, the method comprising:
initializing a kernel filter driver, based on a set of files, by providing to the kernel filter driver a list of file names corresponding to the set of files, the list of file names being determined from a configuration file, wherein the file names in the list of file names are translated from a file namespace format to a device namespace format;
detecting, by the kernel filter driver, a file-write request for a file of the set of files;
copying, by the kernel filter driver, one or more blocks of file-write information from the file-write request to a kernel buffer, the file write information corresponding to a file-write event, wherein the kernel filter driver allows the file-write request to pass through unaffected; and
receiving, at a user mode process running a kernel buffer retrieval operation in a user mode, a portion of data from the kernel buffer comprising file-write information corresponding to at least one file-write event.

25. The media of claim 24, wherein the set of files comprises a plurality of files, the method further comprising:
for each block of file-write information corresponding to one file-write event, in the received portion of data, labeling the block of file-write information according to a source of the file-write event; and
providing the labeled block of file-write information to a monitoring application.

26. The media of claim 24, wherein the set of files comprises a plurality of files, the method further comprising:
for each block of file-write information corresponding to one file-write event, in the received portion of data, labeling the block of file-write information according to a source of the file-write event; and
providing the labeled block of file-write information to a monitoring application, wherein each block of file-write information comprises a file name, file offset, and a write-data payload of file-write information corresponding to one file-write event, wherein a file-write event corresponds to an I/O request to write to a particular file, and wherein labeling the block comprises tagging the block with an identification corresponding to a monitored file targeted by the file-write event.

27. The media of claim 24, wherein the method further comprises performing deduplication on the received portion of data, wherein the portion of data from the kernel buffer comprises at least two blocks of file-write information, each block corresponding to one file-write event, wherein each block of file-write information comprises a file name, file offset, and a write-data payload, and wherein the performed deduplication is based on a comparison of the file name, file offset, and a hash of the write-data payload for the at least two blocks.

28. The media of claim 24, wherein the kernel buffer comprises a first-in-first-out queue, and the file-write information is placed in the tail of the queue, and wherein the method further comprises:

determining the length of the copied file-write information; and storing the length of the copied file-write information as part of the file write information in the tail of the queue.

29. The media of claim 24 further comprising providing the received portion of data to a monitoring application that monitors changes to the file.

\* \* \* \* \*